United States Patent
Vaari et al.

(10) Patent No.: US 9,614,243 B2
(45) Date of Patent: Apr. 4, 2017

(54) MULTILAYERED STRUCTURE COMPRISING AN ENZYME LAYER

(75) Inventors: Anu Vaari, VTT (FI); Ville-Mikko Ojala, VTT (FI); Matti Valkiainen, Espoo (FI); Maria Smolander, Espoo (FI); Harry Boer, Siuntio (FI)

(73) Assignee: Teknologian Tutkimuskeskus VTT Oy (FI)

( * ) Notice: Subject to any disclaimer, the term of this patent is extended or adjusted under 35 U.S.C. 154(b) by 1145 days.

(21) Appl. No.: 13/516,332

(22) PCT Filed: Dec. 16, 2010

(86) PCT No.: PCT/FI2010/051048
§ 371 (c)(1),
(2), (4) Date: Sep. 7, 2012

(87) PCT Pub. No.: WO2011/073530
PCT Pub. Date: Jun. 23, 2011

(65) Prior Publication Data
US 2013/0017457 A1    Jan. 17, 2013

(30) Foreign Application Priority Data
Dec. 16, 2009    (FI) ..................... 20096338

(51) Int. Cl.
*H01M 8/16*    (2006.01)
*H01M 4/88*    (2006.01)
*H01M 4/90*    (2006.01)

(52) U.S. Cl.
CPC ........... *H01M 8/16* (2013.01); *H01M 4/8828* (2013.01); *H01M 4/90* (2013.01); *Y02E 60/527* (2013.01); *Y02P 70/56* (2015.11)

(58) Field of Classification Search
None
See application file for complete search history.

(56) References Cited

U.S. PATENT DOCUMENTS

| | | |
|---|---|---|
| 2005/0196820 A1 | 9/2005 | Zweig |
| 2008/0248374 A1 | 10/2008 | Hatakeyama et al. |
| 2009/0192297 A1 | 7/2009 | Yoshida et al. |

FOREIGN PATENT DOCUMENTS

| | | |
|---|---|---|
| WO | WO 2006/132595 | 12/2006 |
| WO | WO 2007/084249 | 7/2007 |
| WO | WO 2007/147947 | 12/2007 |

OTHER PUBLICATIONS

Zhao, et al.; "Carbon nanotube-hydroxyapatite nanocomposite: A novel platform for glucose/$O_2$ biofuel cell"; Biosensors and Bioelectronics 25 (2009) 463-468.

(Continued)

*Primary Examiner* — Tracy Dove

(57) ABSTRACT

A multilayered structure suitable as an electrode in a power source and a method of producing the same. The structure comprises a conductive laminar layer; and an enzyme layer containing an essentially dry enzyme capable of oxidizing or dehydrogenating carbohydrate material under suitable conditions. Because the enzymatic anode layer and the fuel containing layer are not interacting during the production and since they are kept latent during storage time, the power source will remain stable for extended periods of time, thus increasing the utility of the power source.

27 Claims, 7 Drawing Sheets

(56) References Cited

OTHER PUBLICATIONS

Smolander, et al.; "Development of a printable Iaccase-based biocathode for fuel cell applications"; Science Direct, Enzyme and Microbial Technology, 43 (2008) 93-102.

Deng, et al.; "Multilayer structured carbon nanotubes/poly-1-lysine/laccase composite cathode for glucose/$O_2$ biofuel cell"; Electrochemistry Communicaiton 10 (2008) 1012-1015.

Riva,; "Laccases: blue enzymes for green chemistry"; trends in Biotechnology; vol. 24; No. 5 May 2006.

MULTILAYERED STRUCTURE COMPRISING AN ENZYME LAYER

BACKGROUND OF THE INVENTION

Field of the Invention

The present invention relates to laminate structures for power sources, such as fuel cells. In particular, the present invention concerns multilayered structures suitable as an electrode in power sources, typically comprising a conductive laminar layer in combination with an enzyme layer. The present invention also concerns methods of producing such structures Description of Related Art Fully-enzymatic fuel cells comprising overlapping laminar layers containing enzymes, chemical fuel and electrodes are previously known. In the art, various mixtures of enzymes with mediators, fuel, electrolytes and both conductive and gelling aggregate have been tested. Typically, the fuel component, such as glucose, is mixed with conducting and gluing additives and then printed onto a current collector There is a problem related to the known technology in that the fully-enzymatic fuel cells tend to lose prematurely the energy-capacity by degradation of the fuel: it has been found that during normal production, the fuel/catalyst mixture is reactive and the fuel layer will be consumed already when the cell is being assembled.

SUMMARY OF THE INVENTION

It is an aim of the present invention to eliminate at least some of the problems of the art and to provide novel kinds of anodes for, in particular, printable, fully enzymatic fuel cells.

It is another aim of the present invention to provide a method of producing such anodes. The present invention is based on the idea of keeping the catalyst and fuel layers separated until the cell is assembled and taken into use. At that point of time, the system is activated by moistening it with an electrolyte solution.

Thus, according to the present invention, in a multilayered structure suitable as an electrode in a power source, there is an enzyme layer containing an essentially dry enzyme capable of oxidizing or dehydrogenating carbohydrate material under suitable conditions. A multilayered structure of the present kind can, for example, be accomplished by combining a laminar fuel layer containing a source of chemical energy comprising an essentially dry carbohydrate material and a laminar enzyme layer containing the essentially dry enzyme. These layers are arranged against each other in conductive interrelationship to form a multilayered structure.

Considerable advantages are obtained by the present invention. Thus, the present invention will provide for fully enzymatic, printable electric current sources. Because the enzymatic anode layer and the fuel containing layer are not interacting during the production and since they are kept latent during storage time, the power source will remain stable for extended periods of time, thus increasing the utility of the power source.

The present invention is of potentially immense significance in the respect that it allows for mass production of fully enzymatic fuel cell type power sources using printing technology.

The present structures can be used with various sources of chemical energy, including sugar and honey.

The invention will now be examined more closely with the aid of the following detailed description and working example with reference to the attached drawings.

Figure 1:
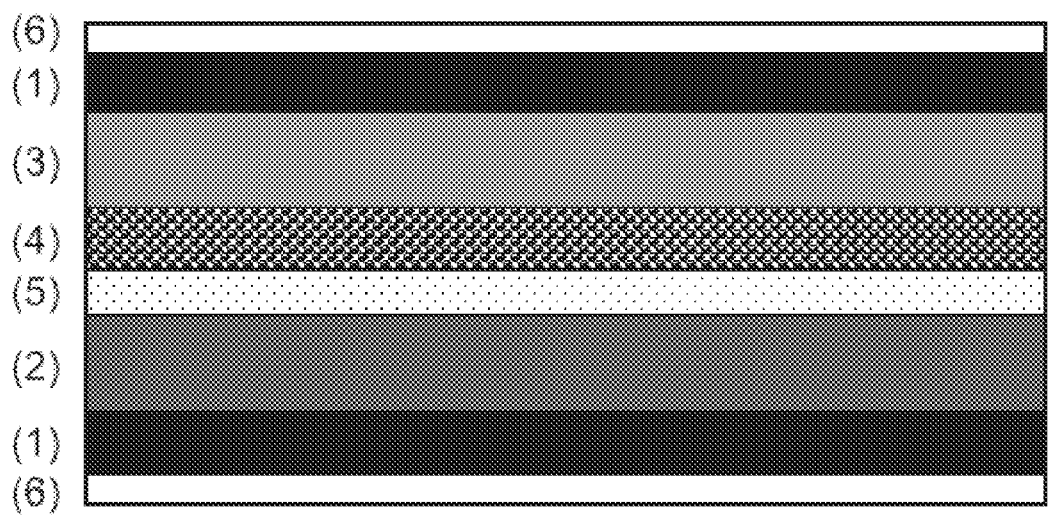
FIG. 1 shows in side view the cross-section of a printed fuel cell according to an embodiment of the present invention with stand alone power sources combined with printed layers.

As discussed above, the present invention provides for anode structures for printable enzyme catalysed fuel cells. Such cells typically have four main components, viz. a current collector, a fuel layer, an enzyme layer and a separator layer for separating the three earlier mentioned layers from the cathode of the fuel cell.

According to one embodiment, the anode structure can be manufactured by first separately combining a current collector with a fuel layer and an enzyme layer with a separator layer. Then the fuel containing layer and the enzyme containing layers are attached to each other and moistened only when the anode is taken into use.

By means of the invention, it becomes possible to fabricate an ink containing both an enzyme/mediator and the fuel to be used and to print this without premature loss of energy of the cell.

For separating the fuel and the enzyme layers from each other there can be a laminar layer arranged between them. Typically the laminar separator layer is of a kind capable of being wetted for transferring moisture or water to the enzyme layer.

The intermediate layer can be porous. Such a porous substrate can selected from the group consisting of porous fibrous webs and sheets of natural or synthetic origin, in particular the porous substrate is selected from cellulosic and lignocellulosic materials, such as paper or cardboard sheets, e.g. filter paper.

Typically, in the above embodiments, the enzyme layer is deposited on a first laminar substrate layer and the fuel layer is deposited on the enzyme layer. Alternatively, the fuel layer can be deposited on a second laminar substrate layer.

The first laminar substrate layer can be formed by a surface layer formed by a membrane permeable to ions.

The second laminar substrate layer can be formed by a sheet of paper, cardboard or plastics, which is essentially impermeable to moisture.

For achieving the desired catalytic activity by the enzyme layer, the enzyme is preferably mixed with an electron transfer mediator.

The oxidizing or dehydrogenating enzyme is selected from the group of peroxidases and oxidases. To mention some examples: the enzyme can be selected from the group of oxidoreductases (EC 1.), including dehydrogenases with NAD+, NADH+, NADP+ or NADPH+ as electron acceptors (EC 1.1.1), e.g. glucose dehydrogenases (1.1.1.47), oxidases with oxygen as electron acceptor (EC 1.1.3) e.g. glucose oxidases (EC 1.1.3.4) and quinoprotein dehydrogenases (EC 1.1.5) e.g. quinoprotein glucose dehydrogenases (EC 1.1.5.2).

The enzyme should have a sufficient activity to activate the cell; preferably the activity is of about 1 to 100,000 nkat/g, preferably 10 to 1000 nkat/g, and it is employed in an amount of 0.0001 to 10 mg protein/g of dry matter of the cathode layer.

The activity of the enzyme is preferably reflected in its redox potential which, expressed as V vs. NHE, is typically about 0.01 to 0.5, preferably not more than 0.3.

Preferably, the enzyme is selected from quinoprotein glucose dehydrogenase (EC 1.1.5.2) from *Gluconobacter oxydans, Gluconobacter suboxydans* or *Acinetobacter calcoaceticus* or glucose oxidase (EC 1.1.3.4) from *Aspergillus niger* or glucose dehydrogenase (1.1.1.47) from *Pseudomonas* sp. or from *Thermoplasma acidophilum.*

The mediator used in the present structures preferably exhibits good electrochemical properties.

In particular, the mediator is selected from the group consisting of TMPD (N,N,N',N'-tetramethyl-p-phenylenediamine), tetracyanoquinodimethane (TCNQ), phenazine methosulphate (PMS), hydroquinone, nickelocene and dimethylferrocene, ferrocene, butyl ferrocene, ferrocene acetic acid, hydroxymethylferrocene, ferrocene dicarboxylic acid, ferrocenecarboxyaldehyde and other ferrocene derivates, and mixtures thereof.

It is preferred to have the mediator present at concentrations in the range of about 0.001 to about 10.0 wt-% of the cathode layer.

Furthermore, the enzyme layer contains a conductive ink. The conductive ink typically comprises an electrically conductive component selected from the group consisting of carbon nanotubes, metal particles, carbon particles and inherently conductive polymers and mixtures thereof and, optionally, a binder.

The fuel layer contains a source of chemical energy selected from the group of mono- and disaccharides. Thus, for example, the fuel layer contains a monosaccharide selected from the group of xylose, glucose, arabinose, mannose, galactose and fructose.

The method of producing a multilayered structure suitable as an electrode in a power source, typically comprises the following steps, viz. forming—in optional order—a first laminar structure by providing a fuel layer containing a source of chemical energy comprising an essentially dry carbohydrate material; and forming a second laminar structure by providing an enzyme layer containing an essentially dry enzyme capable of oxidizing or dehydrogenating the carbohydrate material under suitable conditions.

The fuel layer of the first laminar structure is then placed in abutting relationship with the enzyme layer of the second laminar structure in order to form a multilayered structure.

The step of forming the first laminar structure preferably comprises providing a first substrate layer; depositing on the first substrate layer a conductive layer; and providing on the conductive layer a fuel layer containing a source of chemical energy comprising an essentially dry carbohydrate material of the above kind.

It is possible to deposit the fuel layer from a slurry or a solution. The slurry can have a concentration of the carbohydrate of generally about 0.1 to 75%, preferably about 1 to 50%, in particular about 1 to 30% of the total weight of the slurry or solution. Such a layer is typically dried after deposition.

According to a preferred embodiment which can be combined with any one of the above embodiments, the step of forming the second laminar structure comprises providing a second substrate layer; and providing on the second substrate layer an enzyme layer. Typically, the enzyme layer contains an essentially dry enzyme capable of oxidizing or dehydrogenating the carbohydrate material under suitable conditions. The enzymes can be any of the kinds discussed earlier. As is the case with the fuel layer, the enzyme layer can be deposited from an aqueous slurry or solution, and the deposited layer is preferably dried after deposition.

Using the above components and methods, the conductive layer is formed by printing, coating or by an equivalent technique to provide a layer having an average thickness of about 20 nm to 100 µm.

To achieve the above-explained goal of a laminar structure which is electrically stable during manufacture and storage, it is preferred that either the enzyme layer or the fuel layer is essentially dry upon assembly of the anode structure. In case of the enzyme layer, a maximum moisture content of less than 10% by weight, preferably less than about 5% by weight is preferred. Similarly, an "essentially dry" fuel layer has a moisture content of less than 10% by weight, preferably less than about 5% by weight. It is particularly preferred that the moisture content of the active layers (enzyme and fuel) is less than about 5% by weight for both.

The following non-limiting example will illustrate the invention.

EXAMPLE 1

Production and Purification of ALDH from *Gluconobacter oxydans*

*Gluconobacter oxydans* cells were maintained and cultivated using a three step procedure. Starting with a 3 L pre-culture in shake flasks from which a 28 L pre-fermenter was inoculated, which in turn after 23 h of growth was used to inoculate a 300 L production fermenter. After another 23 h of cultivation the culture (OD=2.8) was cooled to <20° C. and separated in an Alfa Laval separator. The biomass phase was 5.2 liters, this material was centrifuged in a laboratory centrifuge, resulting in a packed cell mass fraction of 970 g (wet weight) which was stored at −20 C and used for the purification of the ALDH enzyme. For this 200 g of cells were first lysed using a French pressure cell at 10.000 psi, after which the ALDH could be extracted from the lysate using the detergent Triton X-100. Four sequential extractions were performed numbered I, II, III and IV ALDH was purified from these detergent extracts using a two column chromatography procedure. Extract I and II were combined and so were extracts III and IV and two purification rounds were performed according to the procedure described below (see Table 1).

The crude extract was first applied to a CM-Sepharose FF cation exchange column in 10 mM NaAc buffer pH 5.0, 0.1% Triton X-100 and the bound protein was eluted using a linear salt gradient. The fractions containing ALDH (based on enzymatic activity) were pooled and further purified using a UNO-Q FPLC anion exchange column in 2.5 mM Tris-HCl pH 7.2, 0.1% Triton X-100. After this ALDH was semi pure as judged by SDS-PAGE. An overview of the yield of the two purifications is can be found in Table 1.

This example illustrates the feasibility to produce aldose dehydrogenase (ALDH) from the bacterium *Gluconobacter oxydans* in a large scale fermentation and purification procedure. This scale up of the enzyme production will facilitate larger scale production of printed enzyme electrodes based in which this enzyme is used as the catalyst.

TABLE 1

Overview of the production of ALDH from 200 g of cells (wet weight) representing ⅓ of the fermentation.

| Batch | Volume (ml) | Activity (nkat/ml) | [Protein] (mg/ml) | Total ALDH activity (nkat) |
|---|---|---|---|---|
| Purification I + II | 10 | 298 | 4.7 | 2984 |
| Purification III + IV | 20 | 79 | 0.45 | 1587 |
| Sum | | | | 4571 |

EXAMPLE 2

Construction of the Printed Paperboard Cell

Enzyme electrodes layers were prepared by coating or printing conductive inks including biocatalytic components on a paper, paper board or a carbon felt support. Active components were entrapped on the support by the physical immobilization effect of the ink.

The structure of the printed paperboard cell is shown in FIG. 1.

The following methods were used to prepare the different layers of the power source: A current collector layer 1 was printed on paperboard (Cupforma classic PE, Stora Enso, Finland) using commercial carbon conductive ink (Peters Carbon-conductive ink SD 2843 HAL) by screen printing. A cathodic enzyme electrode layer 2 was formed on the dry current collector layer using the enzyme-containing active ink consisting 2.5 ml commercial conductive ink (DuPont Carbon 5067), 200 mg carbon nanotubes (multi-wall, diameter 10-30 nm, purity>80% from Hydrocell), 400 nkat laccase from *Trametes hirsuta* (ThL) and 50 mmol 2,2'Azino-bis(3-ethylbenzthiazoline-6-sulfonic acid) (ABTS), ink diluted with 50 mM Na-succinate buffer (pH 4.5) to suitable consistency for coating or printing. A layer 3 forming the anodic enzyme electrode was formed on the dry current collector layer using the enzyme-containing active ink consisting 2.5 ml commercial conductive ink (DuPont Carbon 5067), 200 mg carbon nanotubes (multi-wall, diameter 10-30 nm, purity>80% from Hydrocell), 400 nkat enzyme aldose dehydrogenase from *Gluconobacter oxydans* (ALDH) and 50 mmol redox mediator N'N'N'-tetramethyl-p-phenylenediamine (TMPD), ink diluted with 50 mM K-phosphate buffer pH 6.0 to suitable consistency for coating or printing. A fuel layer 4 was formed from dry glucose powder, scattered directly on the dry anode layer. A separator layer 5 was formed from cellophane membrane Two different methods were used to prepare an enzyme-containing conductive layer, hand coating or screen-printing technique. Hand coating was performed using K Hand Coater from RK Print Coat Instruments Ltd. Whatman 1 filter paper and cellophane membrane (dialyze tube) were used as a printing substrate. Approximate thickness of coating layers was around 50 μm in both methods. Stand alone power sources with printed layers were constructed by sealing the current collector layers with enzyme electrodes, fuel layers and separator layers either in graphite or cardboard shells 6.

To use the power source, it will be activated by moisture. Buffer for example sodium succinate at pH 5.0 were used. The activation could be done before of after sealing. If moistening were done after sealing, the shell layer ought to equip with sufficient opening or pinhole.

EXAMPLE 3

Oxygen Permeability of the Current Collector

Figure 2:
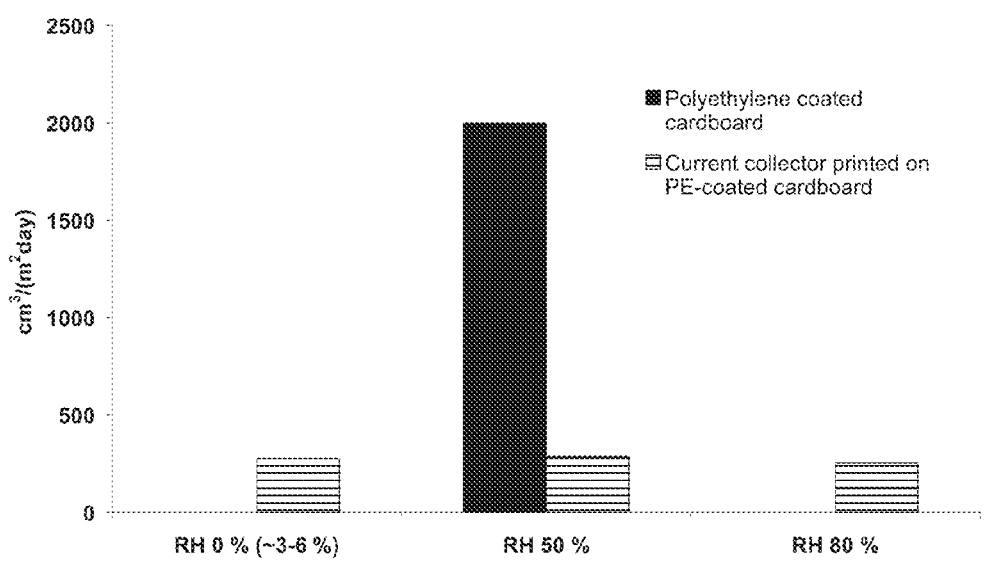
FIG. 2 presents in the form of a bar chart the results of oxygen permeability measurement of a current collector printed on PE coated cardboard.

The oxygen permeability of the polyethylene-coated cardboard, as well as the oxygen permeability of a current collector printed on a polyethylene coated cardboard were determined with 8001 Oxygen Permeability Analyzer. Relative humidity (RH) of 50% was used in the measurement of PE-coated cardboard. Oxygen permeability of the current collector was determined in relative humidity of 0%, 50% and 80%. The oxygen permeability of PE-coated cardboard was measured both before and after the heat treatment needed for curing of the current collector, but the treatment did not have any effect on the oxygen permeability of cardboard. With current collector printed on the cardboard oxygen permeability decreased by 85%, from 2000 $cm^3/m^2$/day to 270 $cm^3/m^2$/day. Relative humidity did not seem to have a major effect on oxygen permeability of the current collector. The results of oxygen permeability measurement are presented in FIG. 2.

This example illustrates the suitability of material with limited oxygen permeability (i.e. 270 $cm^3/m^2$/day) to be used as the shell material of the printed enzymatic power source.

EXAMPLE 4

Discharge Properties of the Fully Enzymatic Power Source

The ALDH/ThL cells constructed between two graphite plates as indicated above were tested with a resistive load 10-75 kOhm after a period of OVC measurement using Agilent 34970A Data Acquisition/Switch Unit with 20 independent positions.

Figure 3:
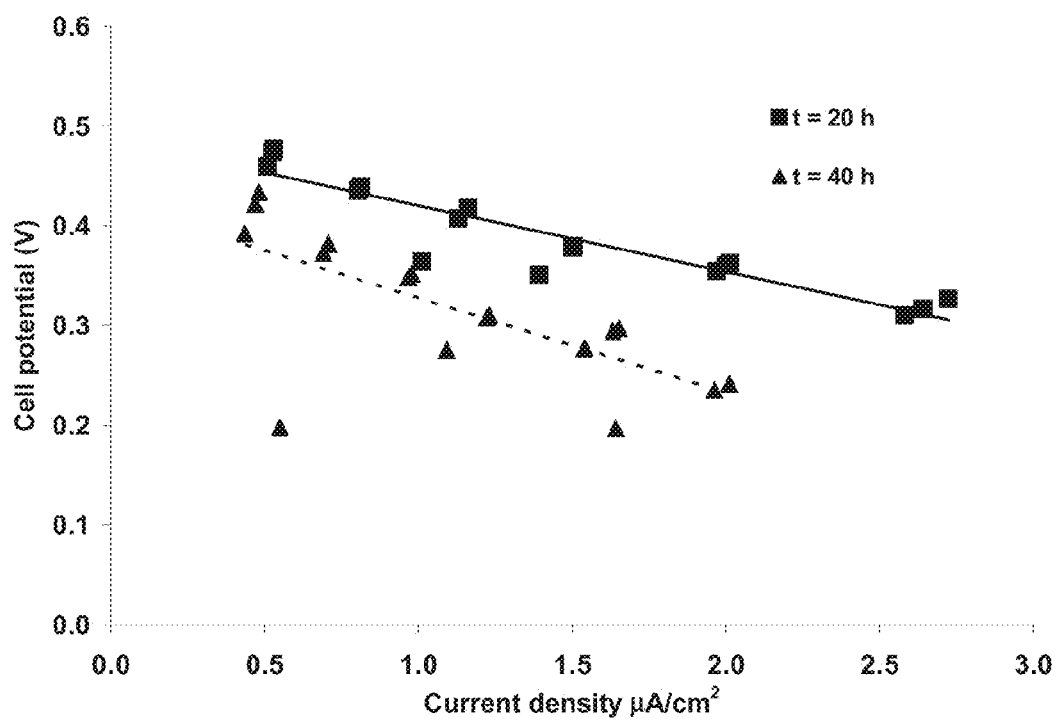
FIG. 3 shows the discharging properties (cell potential as a function of current density) of a printed biofuel cell according to an embodiment of the invention, calculated at two time points (20 h and 40 h)

The discharging properties of the printed biofuel cell calculated at two time points (20 h and 40 h) are shown in FIG. 3. As will appear, the maximum output power of the cell was 11 µW corresponding power density of 0.84 µW/cm².

EXAMPLE 5

Power—Current of the Fully Enzymatic Power Source with Printed Anode

The power curve of the ALDH/ThL cell constructed between two graphite plates as indicated above was measured with a galvanostat connected to a PC. The measurement was started by measuring the open circuit voltage for 40 min thereafter the withdrawn current was increased with 0.2 µA steps every minute until the cell voltage was under 0.1 V.

Figure 4:
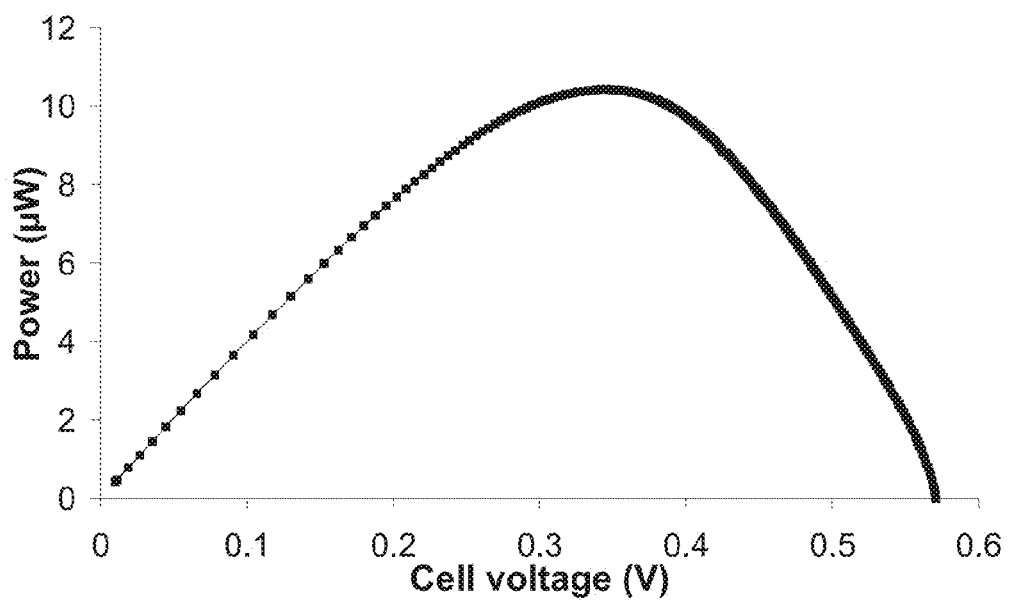
FIG. 4 shows the power output of a cell (6.25 $cm^2$) as a function of cell voltage.

The power output of the cell (6.25 cm²) as the function of the cell voltage is shown in FIG. 4.

EXAMPLE 6

Enzymatic Fuel Cell as the Power Source for Digital Thermometer

Figure 5:
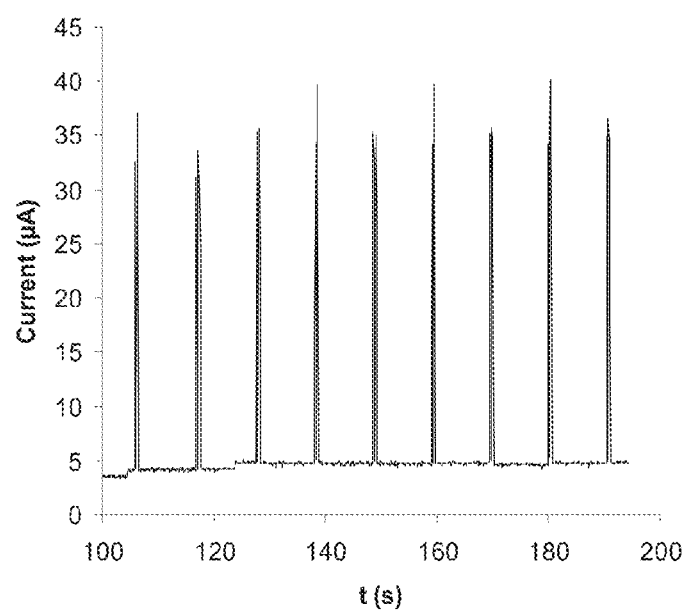
FIG. 5 shows the current consumed by a digital thermometer from a cascade of three ALDH/ThL cells (FC1 to FC3) constructed between two sheets of PE coated cardboard.
Figure 5:
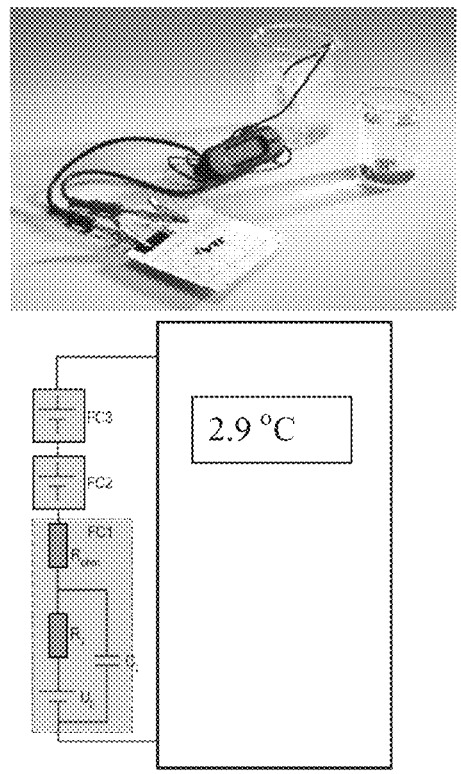

Three ALDH/ThL cells (FC1 . . . 3 in FIG. 5) constructed between two sheets of PE coated cardboard as indicated above were connected in series and the cells were used as a power source for a digital thermometer with a liquid crystal display. Current consumption of a typical digital thermometer (1-1.2 V) to power the thermometer is shown in the graph of FIG. 5. The equivalent circuit of FC1 is indicated with electromotive force $U_0$, internal resistance $R_i$ and ohmic resistance $R_{ohm}$ and an internal effective capacitor $C_i$. This examples indicates that the enzymatic power source can be used to power potential applications with pulsed loading profile.

EXAMPLE 7

Storage Stability of the Printed Anode

Figure 6:
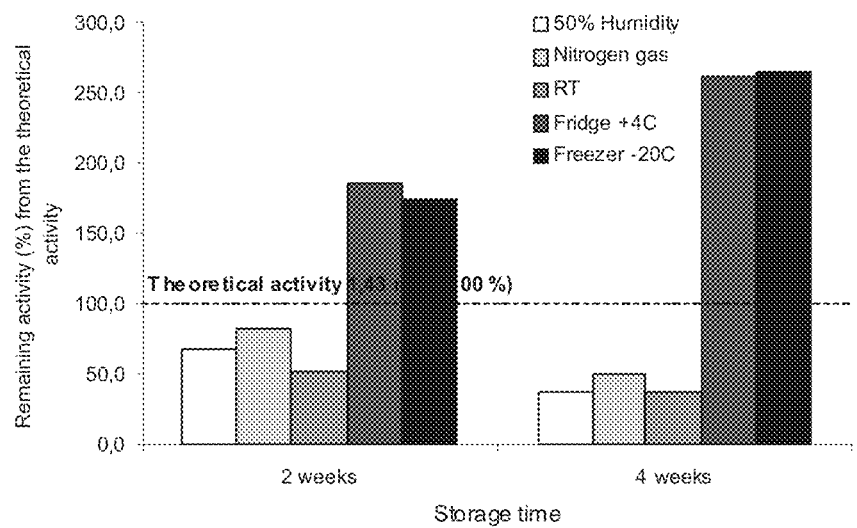
FIG. 6 presents in the form of a bar chart the remaining activity of a conductive bioactive layer after 2 and 4 weeks storage (Example 7)

Aldose dehydrogenase containing layers produced as indicated in Example 5 were stored under different conditions (−20° C., +4° C., +22° C. (ambient/50% RH/under nitrogen) and the remaining enzymatic activity based on oxygen consumption rate coupled to the mediator oxidation was determined during the storage in order to evaluate the long-term storage stability of the printed layers. Low temperatures −20° C. and +4° C. were found to be optimal for the maintenance of the enzymatic activity (cf. FIG. 6).

Figure 7:
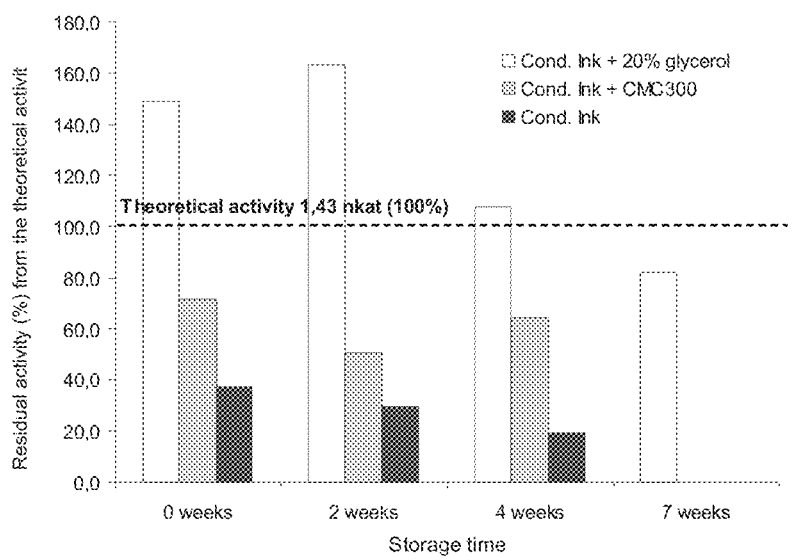
FIG. 7 presents in the form of a bar chart the remaining activity of a conductive bioactive layer after addition of glycerol and carboxymethyl cellulose (Example 7)

Addition of glycerol and carboxymethyl cellulose (CMC) resulted in an increased stability at room temperature and with additives added to the conducting ink the activity could be maintained up to 7 weeks (cf. FIG. 7).

Thus, this example illustrates the suitability of ALDH as the printed, conductive bioactive layer.

EXAMPLE 8

The Effect of Storage Temperature of the Anodic Layer on the Power Source Performance The ALDH/ThL cells constructed between two graphite plates as indicated above were tested with a resistive load 15 kOhm after a period of OVC measurement using Agilent 34970A Data Acquisition/Switch Unit with 20 independent positions. ALDH containing printed layers were stored for 49 days (+4.5° C. or +25° C.).

Figure 8:
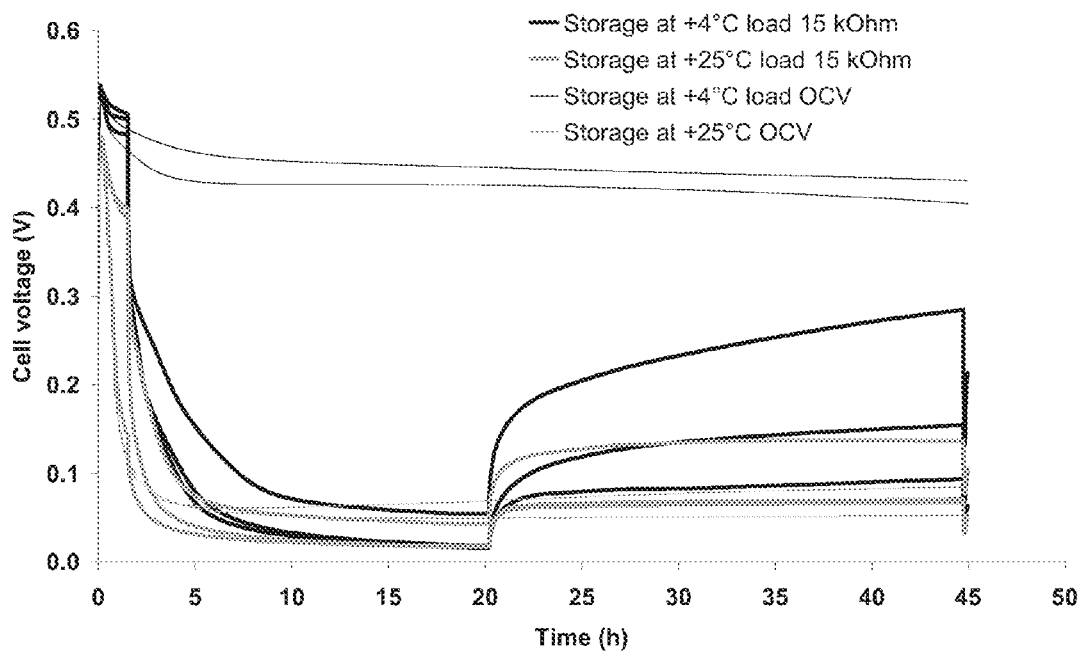
FIG. 8 shows the effect of the storage temperature on the open cell voltage and voltage of the loaded cell (15 kOhm) (Example 8)

The effect of the storage temperature on the open cell voltage and voltage of the loaded cell (15 kOhm) are shown in FIG. 8.

This example indicates that the printed layers can be stored for several weeks before their use in the enzymatic power source and the preferable storage temperature is refrigerated temperature.

EXAMPLE 9

Optimised Glucose Concentration for ALDH

Figure 9:
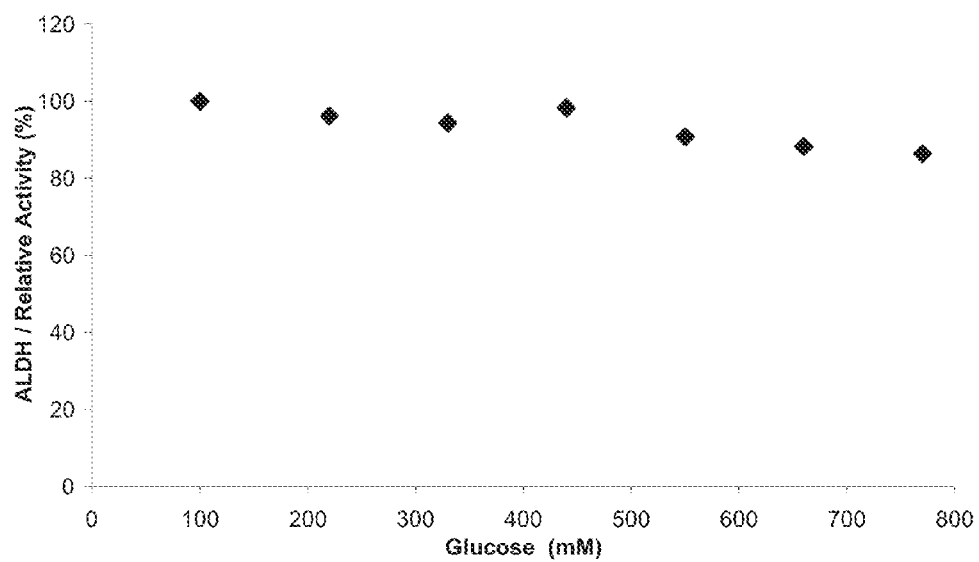
FIG. 9 shows the enzymatic activity of aldose dehydrogenase in the presence of different concentrations of glucose.

The enzymatic activity of aldose dehydrogenase was measured spectrophotometrically using phenazine methosulphate (PMS)—dichlorophenol indophenol (DCIP) mediator system in the presence of different concentrations of glucose. In the concentration range between 100-800 mM the activity was practically independent on the glucose concentration (cf. FIG. 9).

This example illustrates that the enzymatic catalyst is functional in wide concentration range of the fuel.

EXAMPLE 10

Optimised Glucose Concentration for Printed ALDH Electrode

The ALDH/ThL cells constructed between two graphite plates as indicated above were tested with a resistive load of 30 kOhm after a period of OVC measurement using Agilent 34970A Data Acquisition/Switch Unit. In the cell construction different amounts of glucose were used as the fuel.

Figure 10:
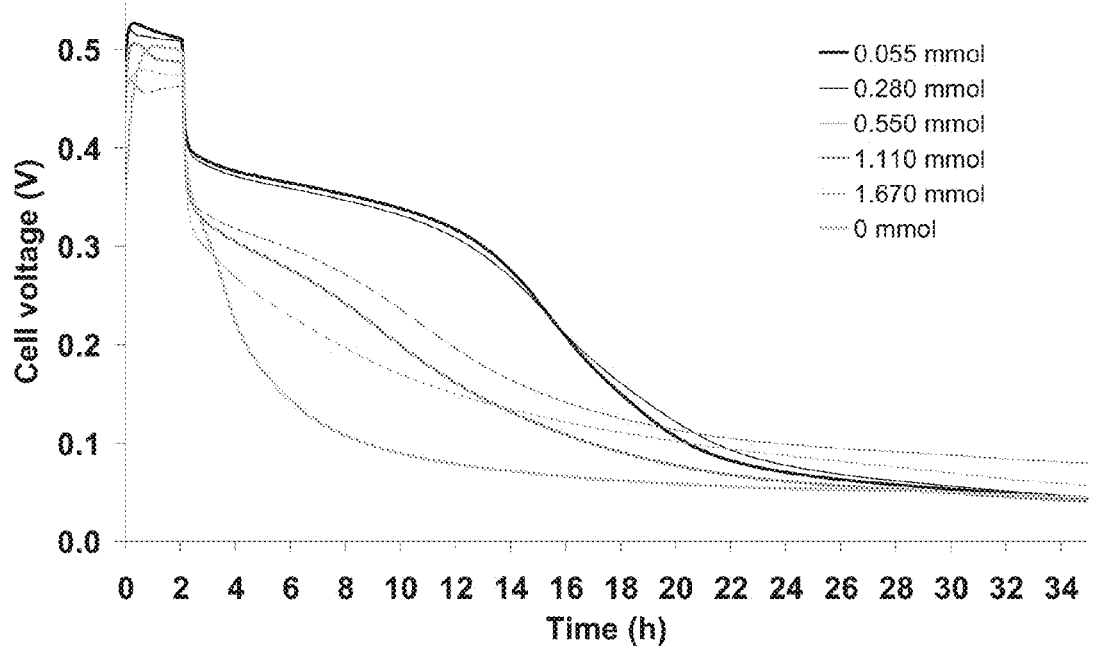
FIG. 10 shows cell voltage as a function of time for ALDH/ThL cells constructed between two graphite plates using different amounts of fuel.

The results are shown in FIG. 10.

As will appear, it was found out that the cell output was highest when the amount of glucose was 50 mg (0.28 mmol) (corresponding 700 mM if all of the glucose is dissolved in the cell). The fuel consumption can be calculated by equation (1) were in the case of glucose fuel cell, z has a value of 2 and F is the faradays constant. For example, this amount, 0.28 mmol, of glucose is sufficient for produce 100 µA current over six days.

$$\Rightarrow n_{fuel}(I, t) = \frac{I \cdot t}{zF} \quad (1)$$

EXAMPLE 11

Burst Test of the Printed Enzymatic Power Source

Figure 11:
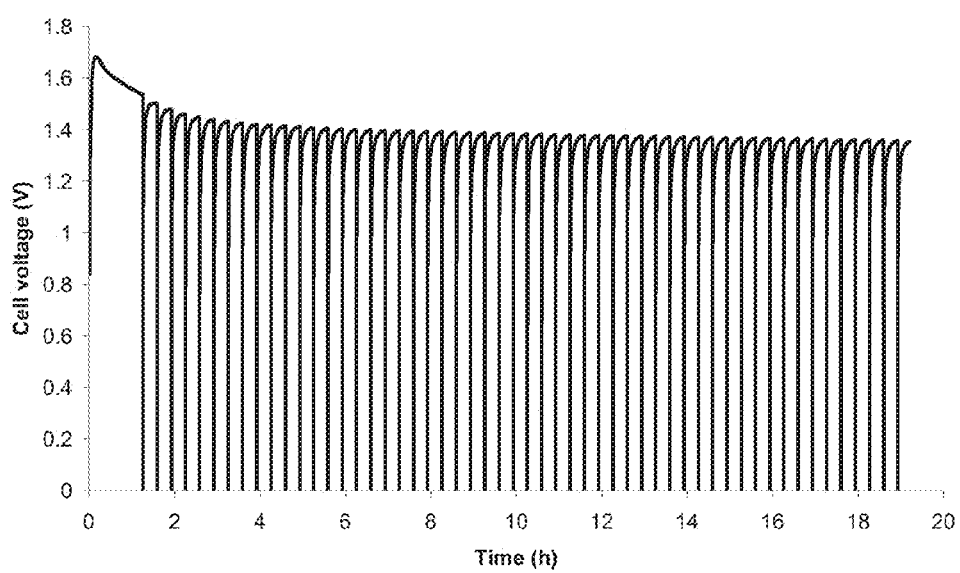
FIG. 11 shows cell voltage as a function of time for three ALDH//ThL enzymatic power sources each constructed between two graphite plates and connected in series when 5 mA current is drawn for 3 s every 20 minutes.

Three ALDH//ThL enzymatic power sources constructed between two graphite plates as indicated above were connected in series and current burst of 5 mA was withdrawn for 3 s every 20 minutes. Cell voltage as a function of time is shown in FIG. 11.

This example demonstrated that even if the cell voltage drops down to 0 V during every burst, the open circuit voltage could be maintained on constant level throughout the whole experiment for several hours.

EXAMPLE 12

Burst Test of the Printed Enzymatic Power Source with Capacitor

Figure 12:
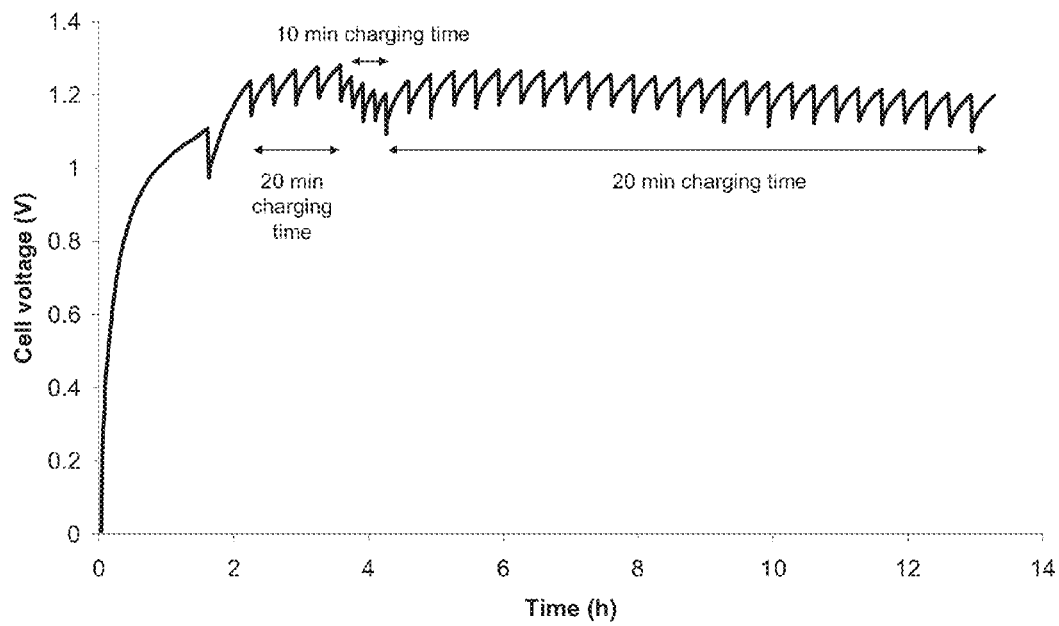
FIG. 12 shows cell voltage as a function of time for three ALDH//ThL enzymatic power sources each constructed between two graphite plates and connected in series with a 0.16 F commercial capacitor when 5 mA current is drawn for 3 s every 20 minutes.

Three ALDH//ThL enzymatic power sources constructed between two graphite plates as indicated above were connected in series with a 0.16 F commercial capacitor and current burst of 5 mA was withdrawn for 3 s every 20 minutes. Cell voltage as a function of time is shown in FIG. 12.

This example demonstrated that with capacitor the loading ability of the system could be considerably increased when the time between the pulses is long enough to allow the loading of the capacitor.

EXAMPLE 13

Comparison of Aldose Dehydrogenase and Glucose Oxidase

The ALDH/ThL cells constructed between two graphite plates as indicated above were tested with a resistive load 0-50 kOhm after a period of OVC measurement using Agilent 34970A Data Acquisition/Switch Unit with 20 independent positions. Parallel to the ALDH containing cells, power sources containing a corresponding amount of glucose oxidase (Gox) as the anodic enzyme were prepared and tested in three pH conditions (4.5, 5 and 6).

Figure 13:
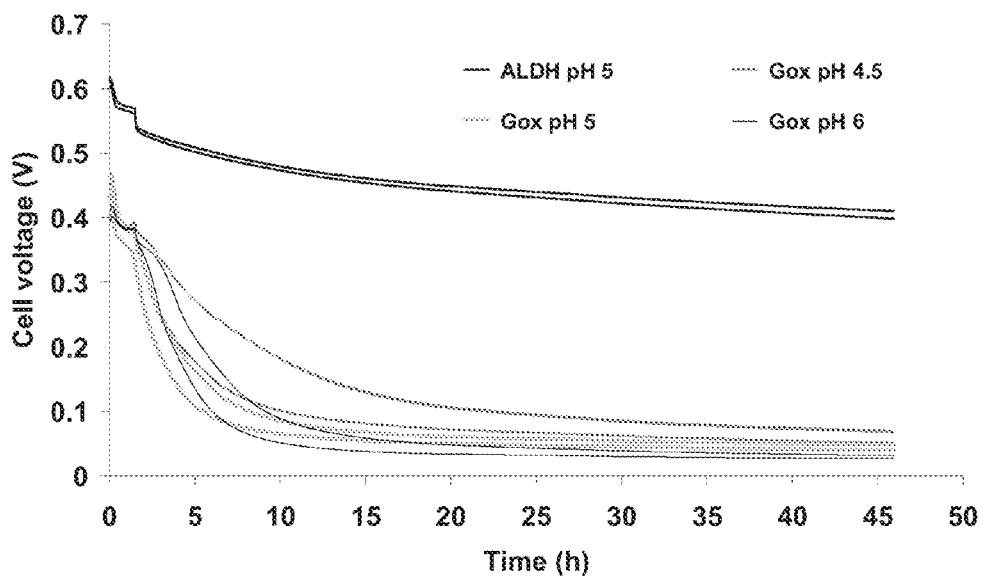
FIG. 13 shows cell voltage as a function of time for ALDH/ThL cells constructed between two graphite plates compared with power sources containing a corresponding amount of glucose oxidase (Gox) at three different pHs.

As can be seen from the results reported in FIG. 13, it was found out that in the particular conditions with TMPD as the electron transfer mediator the performance of the ALDH was better than that of the GOx.

The invention claimed is:

1. A multilayered structure suitable as an electrode in a power source, comprising;
    a conductive laminar layer,
    a laminar enzyme layer containing an essentially dry enzyme capable of oxidizing or dehydrogenating carbohydrate material, and
    a laminar fuel layer containing a source of chemical energy comprising an essentially dry carbohydrate material, wherein said laminar fuel layer essentially abuts with said laminar enzyme layer or wherein said laminar fuel layer is separated from said laminar enzyme layer by a laminar intermediate layer to form said multilayered structure.

2. The multilayered structure according to claim 1, wherein said laminar fuel layer is separated from said laminar enzyme layer by said laminar intermediate layer, said laminar intermediate layer being configured to transfer water to said laminar enzyme layer when wetted.

3. The multilayered structure according to claim 1, wherein said laminar fuel layer stands in direct contact with said laminar enzyme layer.

4. The multilayered structure according to claim 2, wherein said laminar intermediate layer, capable of being wetted, is placed between said laminar fuel layer and said laminar enzyme layer.

5. The multilayered structure according to claim 2, wherein said laminar intermediate layer is porous.

6. The multilayered structure according to claim 5, wherein said laminar intermediate layer comprises a porous substrate selected from the group consisting of: porous fibrous webs and sheets of natural or synthetic origin.

7. The multilayered structure according to claim 1, wherein said laminar enzyme layer is deposited on a first laminar substrate layer.

8. The multilayered structure according to claim 7, wherein said laminar fuel layer is deposited on a second laminar substrate layer.

9. The multilayered structure according to claim 1, further comprising a surface layer formed by a membrane permeable to ions.

10. The multilayered structure according to claim 9, wherein the membrane forms a first laminar substrate layer and said laminar enzyme layer is deposited on the first laminar substrate layer.

11. The multilayered structure according to claim 8, wherein said second laminar substrate layer is formed by a sheet of paper, cardboard or plastics, which is essentially impermeable to moisture.

12. The multilayered structure according to claim 1, wherein said enzyme is mixed with an electron transfer mediator.

13. The multilayered structure according claim 1, wherein said enzyme is selected from the group consisting of peroxidases and oxidases.

14. The multilayered structure according to claim 13, wherein said enzyme is selected from the group consisting of laccases (EC 1.10.3.2), catechol oxidases (EC 1.10. 3.1), tyrosinases (EC 1.14. 18.1), bilirubin oxidases (EC 1.3.3.5), peroxidase (EC 1.11.1.7), manganase peroxidase (EC 1.11.1.13), lignin peroxidase (EC 1.11.1.14), cytochrome-c oxidase (1.9.3.1), L-ascorbate oxidase (1.10.3.3) and ceruloplasmin (1.16.3.1).

15. The multilayered structure according to claim 14, wherein said enzyme has an activity of about 1 to 100,000 nkat/g, and it is employed in an amount of 0.0001 to 10 mg protein/g of dry matter of said laminar enzyme layer.

16. The multilayered structure according to claim 13, wherein said enzyme has a redox potential, expressed as V vs. NHE, of at least 0.3.

17. The multilayered structure according to claim 16, wherein said enzyme is selected from the group consisting of laccase from *Melanocarpus* (EC 1.10.3.2), laccase from *Trametes* (EC 1.10.3.2), laccase from *Pycnoporus* (EC 1.10.3.2), laccase from *Rhizoctonia* (EC 1.10.3.2), laccase from *Coprinus* (EC 1.10.3.2), laccase from *Myceliophtora* (EC 1.10.3.2), laccase from *Pleurotus* (EC 1.10.3.2), laccase from *Rhus* (EC 1.10.3.2), laccase from *Agaricus* (EC 1.10.3.2), laccase from *Aspergillus* (EC 1.10.3.2), laccase from *Cerrena* (EC 1.10.3.2), laccase from *Curvularia* (EC 1.10.3.2), laccase from *Fusarium* (EC 1.10.3.2), laccase from *Lentinius* (EC 1.10.3.2), laccase from *Monocillium* (EC 1.10.3.2), laccase from *Myceliophtora* (EC 1.10.3.2), laccase from *Neurospora* (EC 1.10.3.2), laccase from *Penicillium* (EC 1.10.3.2), laccase from *Phanerochaete* (EC 1.10.3.2), laccase from *Phlebia* (EC 1.10.3.2), laccase from *Podospora* (EC 1.10.3.2), laccase from *Schizophyllum* (EC 1.10.3.2), laccase from *Sporotrichum* (EC 1.10.3.2), laccase from *Stagonospora* (EC 1.10.3.2) laccase from *Chaetomium* (EC 1.10.3.2), laccase from *Bacillus* (EC 1.10.3.2), laccase from *Azospirillum* (EC 1.10.3.2) and laccase from *Trichoderma* (EC 1.10.3.2).

18. The multilayered structure according to claim 12, wherein said electron transfer mediator is selected from the group consisting of ABTS [2,2'-azino-bis(3-ethylbenzothiazoline-6-sulfonic acid)], methyl syringate [methyl 3,5-dimethoxy-4-hydroxybenzoate], other methoxy or dimethoxy phenols, ferrocenecarboxyaldehyde, other ferrocene derivates, and mixtures thereof.

19. The multilayered structure according to claim 12, wherein said electron transfer mediator is present in a concentration of 0.001 to 10.0 wt-% of said laminar enzyme layer.

20. The multilayered structure according to claim 1, wherein said laminar enzyme layer further contains a conductive ink.

21. The multilayered structure according to claim 20, wherein said conductive ink comprises a binder and an electrically conductive component selected from the group consisting of carbon nanotubes, metal particles, carbon particles, inherently conductive polymers, and mixtures thereof.

22. The multilayered structure according to claim 1, wherein said conductive laminar layer is formed by printing or coating to provide a layer having an average thickness of between 20 nm to 100 um.

23. The multilayered structure according to claim 1, wherein said laminar fuel layer contains a source of chemical energy selected from the group consisting of mono- and disaccharides.

24. The multilayered structure according to claim 23, wherein said laminar fuel layer contains a monosaccharide selected from the group consisting of xylose, glucose, galactose and fructose.

25. The multilayered structure according to claim 1, wherein said laminar enzyme layer has a moisture content of less than 10% by weight.

26. The multilayered structure according to claim 1, wherein said laminar fuel layer has a moisture content of less than 10% by weight.

27. A method of producing a multilayered structure suitable as an electrode in a power source, comprising the steps of;
  a. forming a first laminar structure by
    providing a fuel layer containing a source of chemical energy comprising an essentially dry carbohydrate material,
  b. forming a second laminar structure by
    providing an enzyme layer containing an essentially dry enzyme capable of oxidizing or dehydrogenating the carbohydrate material, and
  c. abutting the fuel layer of the first laminar structure with the enzyme layer of the second laminar structure in order to form said multilayered structure.

* * * * *